United States Patent [19]
Norfleet et al.

[11] 3,885,029
[45] May 20, 1975

[54] DENTIFRICE PREPARATION

[75] Inventors: James Norfleet, Plainfield; Donald W. Clipper, Edison, both of N.J.

[73] Assignee: Colgate-Palmolive Company, New York, N.Y.

[22] Filed: Apr. 9, 1973

[21] Appl. No.: 349,314

[52] U.S. Cl. .................. 424/57; 424/52; 424/56; 424/54
[51] Int. Cl. .............................................. A61k 7/16
[58] Field of Search ............................. 424/49–58

[56] References Cited
UNITED STATES PATENTS
| | | | |
|---|---|---|---|
| 3,227,617 | 1/1966 | Manahan et al. | 424/52 |
| 3,325,368 | 6/1967 | Wood | 424/52 |
| 3,647,371 | 3/1972 | Kim et al. | 424/57 |
| 3,662,059 | 5/1972 | Wiesner et al. | 424/50 |

FOREIGN PATENTS OR APPLICATIONS
| | | | |
|---|---|---|---|
| 1,021,058 | 2/1966 | United Kingdom | 424/52 |
| 1,168,366 | 10/1969 | United Kingdom | 424/52 |

*Primary Examiner*—Richard L. Huff
*Attorney, Agent, or Firm*—Robert L. Stone; Murray M. Grill; Herbert S. Sylvester

[57] ABSTRACT

Dentifrice compositions containing anhydrous dicalcium phosphate as the cleaning and polishing agent and a thermoplastic resin such as polyvinyl chloride to impart the desired visual and physical appearance of a dentifrice. The dentifrice may also advantageously contain a fluoride-containing anticaries agent.

4 Claims, No Drawings

DENTIFRICE PREPARATION

This invention relates to a dentifrice preparation containing anhydrous dicalcium phosphate as the cleaning and polishing agent and a thermoplastic resin to impart the visual and physical appearance of a dentifrice.

Up to the present time, it has been generally believed that anhydrous dicalcium phosphate is too abrasive to be used as the sole cleaning and polishing agent in a dentifrice designed for normal daily dental hygiene. It has typically found use in dentifrice formulations primarily as an adjunct to abrasive or polishing systems containing other components.

In the instant invention, advantageously, with particles of anhydrous dicalcium phosphate and particles of a thermoplastic resin, a dentifrice has been formulated having excellent cleaning and polishing characteristics which causes negligible damage to dental hard tissues and enamel. Moreover, we have found that anticariogenic fluoride-containing compounds may be added to the instant dentifrice compositions without loss of effectiveness.

Accordingly, it is an advantage of this invention to provide a dentifrice containing an effective amount of anhydrous dicalcium phosphate as the cleaning and polishing agent.

Another advantage of the present invention is to provide a dentifrice which cleans and polishes teeth effectively.

A further advantage of the present invention is to provide a dentifrice composition characterized by a novel combination of anhydrous dicalcium phosphate and thermoplastic resin.

These and other advantages, objects, and features of the instant invention will be hereinafter described in detail.

In accordance with certain of its aspects, this invention relates to a dentifrice composition containing particles of anhydrous dicalcium phosphate in an amount up to about 30 percent by weight which is effective to clean and polish dental enamel. Typically up to about 20 percent, preferably about 1 to 10 percent, when the dentifrice is a toothpaste, toothpowder, tablet, etc. The anhydrous dicalcium phosphate particles typically range up to about 50 microns in diameter, have an average mean diameter of about 15 to 25 microns, and a Moh hardness of approximately 4. The anhydrous dicalcium phosphate may be prepared by any conventional method known in the art. Typically the thermoplastic resin is present in an amount of about 10 to 60 percent, preferably about 30 to 50 percent, when the dentifrice is a toothpaste, and about 65 to 90 percent, preferably 70 to 85 percent, when the dentifrice is a toothpowder, tablet, etc. The thermoplastic resins typically have an average molecular weight of about 10,000 up to about 500,000, preferably about 10,000 to about 100,000 and a mean diameter of less than 50 microns. The mean diameter is desirably from about 0.5 to 50 microns and preferably from about 15 to 25 microns.

The resins useful in the compositions of this invention include the broad class of synthetic resins classifiable as thermoplastic. They include such resins as the polyolefines, such as polyethylene and polypropylene; polyvinyl chloride; copolymers of chloride and vinyl alcohol, vinyl acetate or vinylidene chloride; polymethyl methacrylate; polyethyl methacrylate; polyisopropyl methacrylate; polyisobutyl methacrylate; polystyrene, polymethyl styrene; natural and synthetic rubbers, such as styrenebutadiene copolymers; polyamides, such as nylon; polyacrylates; cellulosics, such as acetates and butyrates; polycarbonates; acetals, such as polymers of formaldehyde; phenoxys, such as polymers of bisphenol-A and epichlorhydrin; polymers of monomers containing at least 2 polymerisable groups such as polyallyl methacrylate and the polymers of the di-esters of methacrylic acid and ethylene glycol; and mixtures of said resins.

The thermoplastic resins of this invention may be prepared by suspension, bulk, and emulsion polymerisation methods which are well known in the art. The thermoplastic resins may be prepared in bulk and reduced to the desired size by grinding methods well known in the art.

The thermoplastic resin successfully imparts the visual and physical appearance of a dentifrice to the composition without substantially affecting, that is decreasing or increasing, the cleaning and polishing characteristics. The substantial lack of polishing effect and little cleaning effect of the thermoplastic resins is described in Canadian Pat. No. 856,221; U.S. Pat. No. 3,070,510; U.S. Pat. No. 3,151,027, and Larson, *The Swedish Dental Federation Journal*, Volume 61, No. 2, (1969), pages 58–65 (particularly page 64).

It is quite surprising that the ability of the dentifrice of the invention to remove stain and to polish teeth is substantially as satisfactory as if a comparable amount of anhydrous dicalcium phosphate were present with an additional cleaning and polishing agent.

The visual and physical characteristics of a dentifrice imparted by the thermoplastic resin are recognizable when a toothpaste is formed. Its cosmetic and rheological characteristics, including pastiness, viscosity, slight tackiness and easy extrudibility are all highly desirable.

The novel dentifrice of the invention provides normal daily hygienic effectiveness with negligible deleterious effect on dental enamel and dentin.

As previously indicated the instant dentifrice compositions may contain a fluoride-containing anticaries agent. There are many water-soluble inorganic salts which are suitable sources of fluoride ions. Among these are sodium, potassium, ammonium, indium, palladium, stanous ferrous, and lithium fluoride. The monofluorophosphate salts are also useful and include $Na_2PO_3F$, $Na_4P_3O_9F$, $K_4P_3O_9F$, $(NH_4)_4P_3O_9F$, $Na_3KP_3O_9F$, $(NH_4)_3NaP_3O_9F$, and $Li_4P_3O_9F$. Complex water-soluble fluoride-containing salts such as fluorosilicate (i.e., $Na_2SiF_6$), fluorozirconate (i.e., $Na_2ZrF_6$, $SnZrF_6$, $CaZrF_6$), fluorostannite (i.e., $NaTiF_5$), and fluorogermanate (i.e., $K_2GeF_6$) may also be used. Mixed halides such as $SnClF$ and $Sn_2ClF_3$ are also useful. The fluoride ion may also be supplied by an organic fluoride which yields fluoride ions in water. Suitable organic compounds include mono-, di-, and triethanolamine hydrofluoride. These materials are present in an effective but nontoxic amount, usually within the range to provide about 0.01 to 1 percent by weight of the water-soluble fluorine content thereof to the dentifrice. Sodium fluoride, stannous fluoride, and sodium monofluorophosphate ($Na_2PO_3F$) are the preferred compounds.

As herein before indicated these anticariogenic fluorine-containing compounds show no loss of effectiveness often found with conventional dentifrice cleaning and polishing agents.

The essential ingredients of the dentifrices of this invention may be compounded in a number of cosmetically acceptable forms. For example, they may be compounded as a powder, tablet or as a paste.

In the preparation of toothpowders and tablets it is usually sufficient to admix mechanically the various solid ingredients in appropriate quantities and particle sizes.

In dental cream formulations the liquids and solids should necessarily be proportioned to form a creamy mass of desired consistency which is extrudable from an aerosol container or a collapsible tube (for example, aluminum or lined lead). In general, the liquids in the dental cream will comprise chiefly water, glycerine, aqueous solutions of sorbitol, propylene glycol, polyethylene glycol 400, etc. including suitable mixtures thereof. It is advantageous usually to use a mixture of both water and a humectant or binder such as glycerine or sorbitol. The total liquid content will generally be about 20 to 75 percent by weight of the formulation. It is preferred to use also a gelling agent in dental creams such as the natural and synthetic gums and gum-like materials, for example, Irish moss, gum tragacanth, methyl cellulose, hydroxyethyl cellulose, sodium carboxymethyl cellulose, polyvinylpyrrolidone, and starch, usually in an amount up to about 10 percent, and preferably about 0.2 to 5 percent of the formulation. It is preferred to use gelling agents which are most compatible with fluoride ions such as methyl cellulose and hydroxyethyl cellulose.

Organic surface-active agents are used in the compositions of the present invention to assist in achieving thorough and complete dispersion of the instant compositions throughout the oral cavity and render them more cosmetically acceptable. The organic surface-active material may be anionic, nonionic, ampholytic, or cationic in nature, and it is preferred to employ as the surface-active agent a detersive material which imparts to the composition detersive and foaming properties. Suitably such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, olefin sulfonates such as those containing 8 to 25 carbon atoms, alkyl aryl sulfonates, such as sodium dodecyl benzene sulfonate, higher alkyl sulfoacetates, higher fatty acid ester of 1, 2 dihydroxy propane sulfonates, and the substantially saturated higher aliphatic acyl amides of lower aliphatic amino carboxylic acid compounds, such as those having 12 to 16 carbon atoms in the fatty acid, alkyl, or acyl radicals, N-2 ethyl higher alkyl sulfoacetamide, preferably N-2 ethyl laurate potassium sulfoacetamide, and the like. Examples of the forementioned amides are N-lauroyl sarcosine, and the sodium, potassium, and ethanolamine salts of N-lauroyl, N-myristoyl, or N-palmitoyl sarcosine which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid formation in the oral cavity due to carbohydrate breakdown in addition to exerting some reduction in the solubility of tooth enamel in acid solutions. Another preferred material is a long chain fatty acid sodium coconut monoglyceride sulfonate used alone or in combination with sodium lauryl sulfate.

Other particularly suitable surface-active materials include nonionic agents such as condensates of sorbitan monostearate with approximately 60 moles of ethylene oxide, condensates of ethylene oxide with propylene oxide condensates of propylene glycol (available under the trademark "Pluronics") and amphoteric agents such as quaternized imidazole derivatives which are available under the trademark "Miranol" such as Miranol C$_2$M. Cationic surface-active germicides and antibacterial compounds may also be used. Such compounds include di-isobutylphenoxyethoxyethyl dimethyl benzyl ammonium chloride, benzyl dimethyl stearyl ammonium chloride, tertiary amines, having one fatty alkyl group (of from 12 to 18 carbon atoms) and two (poly)oxyethylene groups attached to the nitrogen (typically containing a total of from about 2 to 50 ethenoxy groups per molecule) and salts thereof with acids, and compounds of the structure:

where R is a fatty alkyl group containing from about 12 to 18 carbon atoms, and x, y, and z total 3 or higher, as well as salts thereof with mineral or organic acids. It is preferred to use from about 0.05 to 5 percent by weight of the foregoing surface active materials in the instant dentifrice preparations.

In accordance with certain additional aspects of this invention, cationic antibacterial agents are included in the compositions of the present invention. Such agents include:

$N^1$-(4-chlorobenzyl)-$N^5$-(2,4-dichlorobenzyl)biguanide;
p-chlorophenyl biguanide;
4-chlorobenzhydryl biguanide;
4-chlorobenzhydrylquanylurea;
N-3-lauroxpropyl-$N^5$-p-chlorobenzylbiguanide;
1,6-di-(p-chlorophenylbiguanido)hexane;
1,6-Bis(2-ethylhexyl-biguanido)hexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis (2-ethylhexyl)-5-methylhexahydropyrimidine;

and their nontoxic acid addition salts, particularly the fluorides and the dihydrogen fluorides. 1,6-di-(p-chlorophenylbiguanido)hexane is particularly preferred. These agents may be used in amounts ranging from about 0.01 to 5 percent and preferably about 0.05 percent to 1.0 percent by weight of the dentifrice.

Any suitable flavoring or sweetening materials may be employed in formulating a flavor for the compositions of the present invention. Examples of suitable flavoring constituents include the flavoring oils, for example, oils of spearmint, peppermint, wintergreen, sassafras, clove, sage, eucalyptus, marjoram, cinnamon, lemon, and orange, as well as methylsalicylate. Suitable sweetening agents include sucrose, lactose, maltose, sorbitol, sodium cyclamate, perillartine, and saccharine. Suitably, flavor and sweetening agent together comprise from about 0.01 to 5 percent or more of the compositions of the instant invention.

VArious other materials may be incorporated into the dentifrice preparations of this invention. Examples thereof are coloring and whitening agents, preservatives, silicones, chlorophyll compounds, ammoniated materials such as urea, diammoniumphosphate, and mixtures thereof, and other constituents. These adjuvants are incorporated in the instant compositions in amounts which do not substantially adversely affect the properties and characteristics desired and are selected and used in proper amount depending upon the particular type of preparation involved.

In addition to the embodiment of the invention as set out earlier in which anhydrous dicalcium phosphate is the cleaning and polishing agent, there may also, however, not of necessity, be present additional conventional cleaning and polishing agents. Such agents include calcium pyrophosphate, calcium hydrogen phosphate dihydrate, insoluble sodium metaphosphate, calcium carbonate, dicalcium phosphate dihydrate, talcs [$Mg_3Si_4O_{10}(OH)_2$] containing at least a minor amount of tremolite [$CaMg_3(SiO_3)_4$], hydrated alumina, magnesium carbonate, magnesium orthophosphate, natural and synthetic silica, zirconium silicate, tricalcium phosphate, calcium sulfate, etc. The substantially water-impervious, cross-linked, thermosetting, highly-polymerized synthetic resins described in U.S. Pat. No. 3,450,813 (e.g., melamine formaldehyde resins) may also be included in the compositions of this invention. These conventional cleaning and polishing agents may be typically present in an amount of from about 10 to about 50 percent by weight of the anhydrous dicalcium phosphate without substantially altering the highly desirable characteristics of the instant dentifrices.

It is desirable to adjust the pH of the dentifrice compositions to a range of about 3 to 9 using such acids as citric, acetic, chloropropionic, malonic, formic, benzoic fumaric, methoxyacetic, and propionic. Lower pH's than 3 are undesirable for oral use and lead to hydrolysis and corrosion problems. When stannous ions are present, the pH should be lower than about 5. The preferred pH range is 3.5 to about 5.0 when stannous ions are present and about 4.5 to about 7.0 in the absence of stannous ions.

The compositions of the invention are prepared in the conventional manner. The toothpastes are formed by incorporating particles of anhydrous dicalcium phosphate and of the thermoplastic resin into a gel formed by adding a pre-mix of gelling agent, such as sodium carboxymethylcellulose, sodium benzoate, and sodium saccharine to a humectant, such as glycerine, to which water is then added. The particles of anhydrous dicalcium phosphate and of thermoplastic resin are mixed into the gel under agitation at room temperature and remain substantially individual units in the finished toothpaste. Detergent and flavor and other ingredients are added, as desired.

The following specific examples are further illustrative of the present invention, but it is understood that the invention is not limited thereto. All amounts and proportions are by weight unless otherwise indicated.

EXAMPLE 1

| | Parts by Weight |
|---|---|
| Glycerine | 19.95 |
| Water | 26.986 |
| Polyvinyl chloride | 40.00 |
| Anhydrous dicalcium phosphate | 5.00 |
| Sodium carboxymethylcellulose | 0.85 |
| Sodium benzoate | 0.50 |
| Sodium N-lauryl sarcosine (35% soln.) | 5.714 |
| Sodium saccharine | 0.20 |
| Flavor | 0.80 |

The toothpaste of Example 1 has excellent cleaning and polishing characteristics, good visual and physical appearance, and is not unduly abrasive. The anhydrous dicalcium phosphate has a mean diameter of about 15 microns and the polyvinyl chloride a mean diameter of about 15 microns.

EXAMPLE 2

The following toothpaste is prepared which has excellent cleaning and polishing characteristics, and is cosmetically acceptable, and is not unduly abrasive:

| | Parts by Weight |
|---|---|
| Glycerine | 22.00 |
| Water | 25.24 |
| Polyvinyl chloride | 43.00 |
| Anhydrous dicalcium phosphate | 5.00 |
| Sodium carboxymethylcellulose | 1.00 |
| Sodium benzoate | 0.50 |
| Sodium lauryl sulfate | 1.50 |
| Sodium saccharine | 0.20 |
| Sodium monofluorophosphate | 0.76 |
| Flavor | 0.80 |

EXAMPLE 3

The following toothpowder is prepared which has excellent cleaning and polishing characteristics, and is not unduly abrasive;

| | Parts by Weight |
|---|---|
| Polyvinyl chloride | 73.50 |
| Anhydrous dicalcium phosphate | 25.00 |
| Sodium benzoate | 0.50 |
| Sodium saccharine | 0.20 |
| Flavor | 0.80 |

To determine the efficacy of the novel combination of anhydrous dicalcium phosphate and a thermoplastic resin, comparative tests as to enamel cleaning and dentin abrasion of commercial dentifrices were made. Dentin abrasion tests were made based on the radioactive technique described in the literature by Grabenstatter, et al., *Journal of Dental Research* 37, 1060 (1958). The instant combination of anhydrous dicalcium phosphate and thermoplastic resin was compared with the abrasive systems of several commercial dentifrices. The results are seen in Table 1 below:

Table 1

| Dentin Abrasion Test Results<br><br>Cleaning Agent | Radioactive Dentin Abrasion (relating values) |
|---|---|
| A Anhydrous dicalcium phosphate (5%) polyvinyl chloride (40%) | 155 |
| B Calcium pyrophosphate (40%) | 290 |
| C $CaCO_3$ (50%) | 420 |
| D Insoluble sodium metaphosphate (40%)- $CaHPO_4$ (5%) | 310 |

Table 1-Continued

| Cleaning Agent | Dentin Abrasion Test Results Radioactive Dentin Abrasion (relating values) |
|---|---|
| E CaHPO$_4$.2H$_2$O (52%) CaCO$_3$ (5%) ZrSiO$_4$ (1%) | 135 |
| F CaHPO$_4$.2H$_2$O (47%) CaHPO$_4$ (5%) | 330 |

The radioactive dentin value of the instant combination is 155 units, which is significantly lower or comparable to typical values determined in the same manner for commercial toothpastes (Except E).

The ability of the abrasion systems of dentifrices A–F to remove stains was determined in the following way: sections of human dental enamel were etched with 0.1N HCl for 2 minutes, rinsed with water, then wet with a dilute solution of stannous fluoride, wiped dry, and finally exposed to a stream of hydrogen sulfide gas which resulted in the deposition of a brown deposit of stannous sulfide. The amount of stain on the surface was measured with a Gardner Automatic Color Difference Meter. The surface was then brushed with a mechanical brushing machine for 3000 reciprocal strokes with a slurry of a dentifrice and the residual stain measured with a meter. Finally, the stain which remained was completely removed with dental pumice and the reflectance of this surface was read. The ability of a dentifrice to remove the stain is expressed by Equation 1.

$$\% \text{ stain removed} = \frac{(R_D \text{ 3000 strokes} - R_D \text{ initial}) \cdot 100}{R_D \text{ pumiced} - R_D \text{ initial}} \quad (Eq. 1)$$

Where $R_D$ initial, $R_D$ 3000 strokes, and $R_D$ pumiced are respectively the reflectance values measured on the initially stained surface, after brushing for 3000 reciprocal strokes, and after removing the residual stain with pumice.

Table 2 recites the stain removal values for the abrasive systems of dentifrices A–F.

Table 2

| Cleaning Agent | Stain Removal Test Results Percent Stain Removal |
|---|---|
| A | 72% |
| B | 77% |
| C | 70% |
| D | 70% |
| E | 29% |
| F | 60% |

The results in Table 2 show that the anhydrous dicalcium phosphate-polyvinyl chloride system has excellent enamel cleaning properties. It is essentially equivalent to or better than dentifrices C, D, and F which have much higher dentin abrasion values and much better than dentifrice E which is similar in dentin abrasion. System B, though somewhat more effective as a stain remover than the instant system, has a higher radioactive dentin abrasion. Therefore, it is clearly evident that in comparison with commercial toothpastes the combination of anhydrous dicalcium phosphate and a thermoplastic resin is far superior since it abrades to a lesser degree and cleans more effectively.

It is apparent that the above examples illustrate the invention and various modifications may be made thereto.

What is claimed is:

1. A dentifrice preparation comprising about 30 to 50 percent by weight of said dentifrice of individual particles of polyvinyl chloride and a cleaning and polishing material which consists of up to about 15 percent by weight of said dentifrice of individual particles of cleaning and polishing material wherein anhydrous dicalcium phosphate having particles of sizes ranging up to about 50 microns is present in an amount of effective to clean and polish dental enamel up to about 10 percent by weight of said dentifrice and at least two-thirds by weight of said cleaning and polishing material is anhydrous dicalcium phosphate.

2. The dentifrice preparation of claim 1 in which the mean diameter of said anhydrous dicalcium phosphate ranges up to 25 microns and the mean diameter of said thermoplastic resin particles ranges from about 0.5 to about 50 microns.

3. The dentifrice preparation of claim 1 in which said anhydrous dicalcium phosphate is present in an amount of about 1 to 10 percent.

4. The dentifrice preparation of claim 3 wherein said particles of anhydrous dicalcium phosphate and of polyvinyl chloride are in a toothpaste gel vehicle.

* * * * *